(12) United States Patent
Matsumoto et al.

(10) Patent No.: US 9,517,799 B2
(45) Date of Patent: Dec. 13, 2016

(54) VEHICLE FRONT PORTION STRUCTURE

(71) Applicant: TOYOTA JIDOSHA KABUSHIKI KAISHA, Toyota-shi (JP)

(72) Inventors: Ryoji Matsumoto, Okazaki (JP); Hironori Kadoi, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 29 days.

(21) Appl. No.: 14/698,054

(22) Filed: Apr. 28, 2015

(65) Prior Publication Data

US 2016/0318552 A1   Nov. 3, 2016

(51) Int. Cl.
| | | |
|---|---|---|
| B60N 99/00 | (2006.01) | |
| B62D 21/15 | (2006.01) | |
| B62D 25/08 | (2006.01) | |
| B60R 19/34 | (2006.01) | |
| B60R 19/24 | (2006.01) | |

(52) U.S. Cl.
CPC .............. *B62D 21/152* (2013.01); *B60R 19/34* (2013.01); *B62D 25/08* (2013.01); *B60R 2019/247* (2013.01)

(58) Field of Classification Search
CPC ....... B62D 21/152; B62D 25/08; B60R 19/34; B60R 2019/247
See application file for complete search history.

(56) References Cited

U.S. PATENT DOCUMENTS

| | | | |
|---|---|---|---|
| 9,061,713 B2* | 6/2015 | Hashimoto | .......... B62D 21/152 |
| 9,233,715 B1* | 1/2016 | Ramoutar | ............ B62D 25/082 |
| 2015/0001880 A1* | 1/2015 | Matsuo | ................ B62D 25/082 |
| | | | 296/187.1 |

FOREIGN PATENT DOCUMENTS

| | | |
|---|---|---|
| JP | 2004-66932 A | 3/2004 |
| JP | 2014-113894 A | 6/2014 |
| JP | 2014-223892 A | 12/2014 |

* cited by examiner

*Primary Examiner* — Lori L Lyjak
(74) *Attorney, Agent, or Firm* — Oblon, McClelland, Maier & Neustadt, L.L.P.

(57) ABSTRACT

A vehicle front section structure includes: a pair of left and right front side members extending along a vehicle front-rear direction at both vehicle width direction sides of a power unit installed in a vehicle front section; a spacer including an angled wall that is provided at a side face on a vehicle width direction outer side of the front side member, that is disposed at the vehicle width direction outer side of the side face, and that increases in distance from the side face on progression toward a vehicle front side, and including a rear end wall extending from a rear end of the angled wall toward the side face, and a spacer extension portion that is provided at the vehicle width direction outer side of the angled wall of the spacer, and that includes an extension wall extending the rear end wall of the spacer toward the vehicle width direction outer side.

16 Claims, 10 Drawing Sheets

VEHICLE FRONT PORTION STRUCTURE

BACKGROUND

The present invention relates to a vehicle front section structure adapted for a frontal collision.

RELATED ART

There are various modes of frontal collision, including full overlap collisions, offset collisions, and oblique collisions. Recently, there are calls for countermeasures against more demanding collision modes, such as small overlap collisions (passing collisions) or similar collisions, in which another vehicle or the like (referred to below as a "barrier") collides at the vehicle width direction outer side of a front side member.

As an example of a small overlap collision countermeasure, technology has been proposed in which a spacer is provided from a rear face of a vehicle width direction end portion of front bumper reinforcement toward a side face of a front side member (see, for example, Japanese Patent Application Laid-Open (JP-A) No. 2014-113894). According to this technology, in the event of a small overlap collision, collision load input to the vehicle width direction end portion of the front bumper reinforcement is transmitted by the spacer to the side face of the front side member. The front side member accordingly undergoes bending deformation toward the vehicle width direction inside, and the bent location contacts a side face of a power unit that is a section of the vehicle where mass is concentrated. Lateral force (force due to inertia) is accordingly generated on the power unit toward the opposite side to the collision side, enabling the vehicle itself to be moved toward the opposite side to the collision side, and moving the vehicle away from a barrier.

Although the above technology is beneficial, further improvement is desired with respect to small overlap collisions. Specifically, owing to various reasons, sometimes it is not possible to cause the generation of lateral force on the power unit to occur stably.

For example, changing the speed of collision with a barrier changes the way in which the spacer contacts the power unit across the front side member. Moreover, in different vehicle types, there is obviously variation in the shape and placement of the power unit, and in the shape and placement of structural members of the vehicle body, which in turn change the way in which the spacer contacts the power unit across the front side member. Moreover, even within a single type of vehicle, manufacturing tolerances and assembly tolerances in the power unit and structural members of the vehicle body are additive, thereby changing the way in which the spacer contacts the power unit across the front side member. Variation accordingly emerges in the way the spacer contacts the power unit across the front side member due to such sundry variation. It is conceivable that such variation could, for example, reduce the collision load that the spacer transmits to the power unit across the front side member, or shorten the duration for which the spacer is in contact with the power across the front side member.

In consideration of the above circumstances, an object of the present invention is to obtain a vehicle front section structure capable of, during a small overlap collision, causing stable axial compression deformation of a front side member along a vehicle front-rear direction, and of generating lateral force on a power unit stably, even when there is variation in the vehicle structure, test conditions, or the like.

SUMMARY

In order to achieve the above object, a vehicle front section structure comprising:
a pair of left and right front side members extending along a vehicle front-rear direction at both vehicle width direction sides of a power unit installed in a vehicle front section; a spacer including an angled wall that is provided at a side face on a vehicle width direction outer side of the front side member, that is disposed at the vehicle width direction outer side of the side face, and that increases in distance from the side face on progression toward a vehicle front side, and including a rear end wall extending from a rear end of the angled wall toward the side face; and a spacer extension portion that is provided at the vehicle width direction outer side of the angled wall of the spacer, and that includes an extension wall extending the rear end wall of the spacer toward the vehicle width direction outer side.

According to the vehicle front section structure of the one aspect of the present invention, in the event of a small overlap collision, collision load is input from a barrier to the spacer provided at the side face on the vehicle width direction outer side of the front side member. The collision load input to the spacer is transmitted through the angled wall and the rear end wall of the spacer to the side face on the vehicle width direction outer side of the front side member. The front side member accordingly undergoes bending deformation toward the vehicle width direction inside, and the location that has undergone bending deformation contacts the power unit, thereby generating lateral force (force due to inertia) on the power unit toward the opposite side to the collision side.

Note that it is conceivable that variations in vehicle structure, test conditions, or the like could cause change in the way the spacer contacts the power unit across the front side member, preventing a target load from being stably obtained.

However, in the present invention, the spacer extension portion is provided at the vehicle width direction outer side of the angled wall of the spacer, and the extension wall extends the rear end wall of the spacer to toward the vehicle width direction outer side. Accordingly, even if a reduction in load with which the spacer causes axial compression deformation of the front side member in the vehicle front-rear direction, or a reduction in load with which the spacer pushes the power unit toward the opposite side to the collision side, was to occur due to variations in vehicle structure, test conditions, or the like, the extension wall of the spacer extension portion would, in place of the rear end wall of the spacer, cause the front side member to undergo axial compression deformation in the vehicle front-rear direction, and lateral force would still be generated on the power unit so as to push the power unit toward the opposite side to the collision side.

The vehicle front section structure of one aspect of the present invention accordingly enables, during a small overlap collision, stable axial compression deformation of a front side member along a vehicle front-rear direction, and also stable generation of lateral force on a power unit, even when there are variations in vehicle structure, test conditions, or the like.

DETAILED DESCRIPTION

Figure 1:
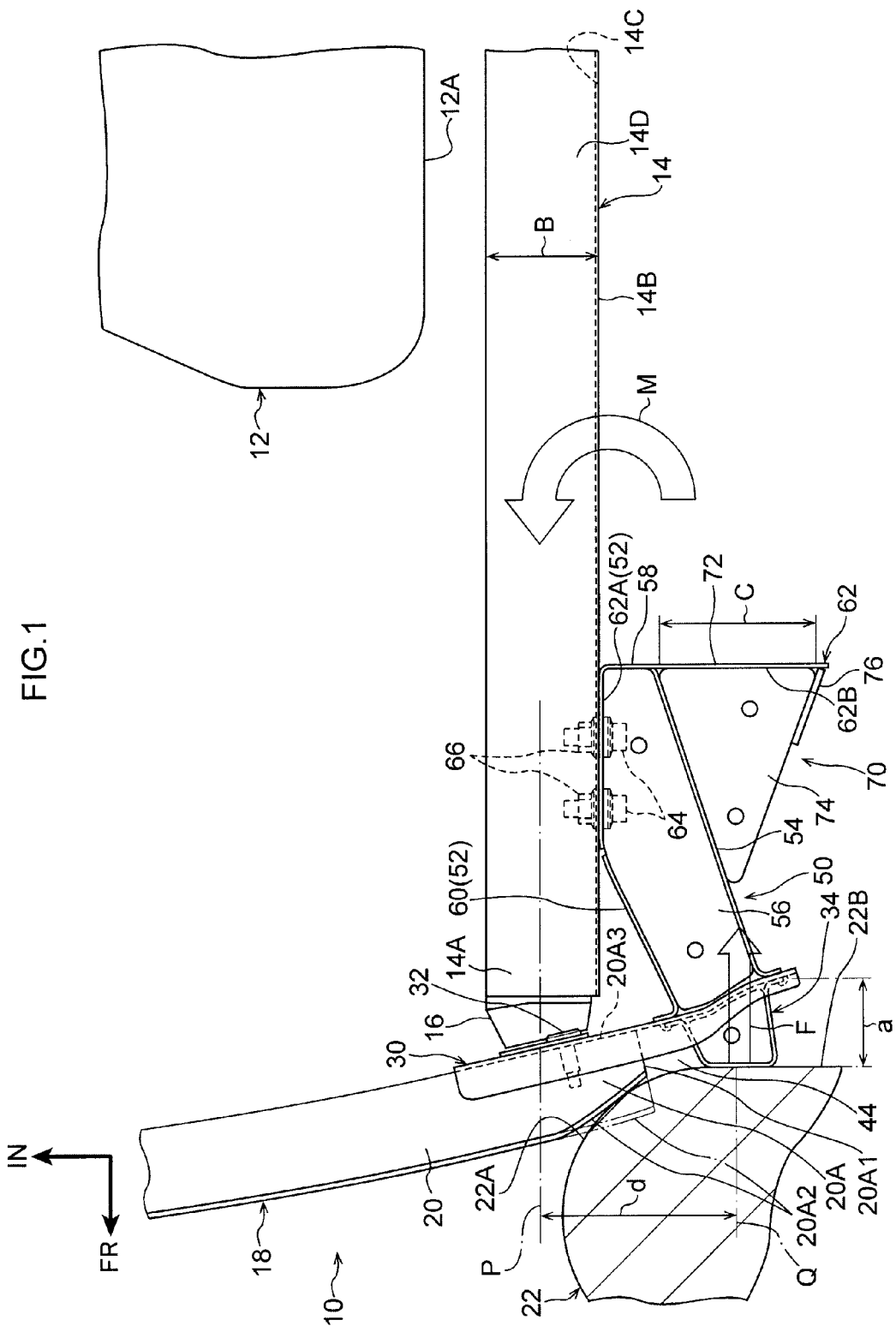
FIG. 1 is a plan view of an overall vehicle front section structure of an exemplary embodiment of the present invention, illustrating a state in an initial period during a small overlap collision.

Detailed explanation follows regarding an exemplary embodiment of the present invention, with reference to the drawings. In the drawings, the arrow FR indicates a vehicle front side, the arrow UP indicates the vehicle upper side, and the arrow IN indicates the vehicle width direction inside, as appropriate.

Peripheral Configuration

As illustrated in FIG. 1, a power unit 12 is installed in a vehicle front section 10. A pair of left and right front side members 14 are installed extending along the vehicle front-rear direction at both vehicle width direction sides of the power unit 12. Each front side member 14 is disposed with its length direction along the vehicle front-rear direction. Each front side member 14 has a rectangular shaped cross-section profile. As an example, each front side member 14 is configured with a closed cross-section structure by joining together a pair of flanges of an inner panel disposed on the vehicle width direction inside, and a pair of flanges of an outer panel disposed on the vehicle width direction outer side, by a joining method such as spot welding. Note that the configuration of the front side members is not limited thereto, and various structures may be employed.

Front end portions 14A of the pair of left and right front side members 14 are coupled together by bumper reinforcement 18, through spacers 16 that are joined to the front end portions 14A and extension portions 30, described later. The bumper reinforcement 18 is a high strength and high rigidity member disposed with its length direction substantially along the vehicle width direction, and is, for example, configured with a rectangular shaped closed cross-section structure. Note that the configuration of the bumper reinforcement 18 is not limited thereto, and various structures may be employed.

In plan view of the bumper reinforcement 18, a vehicle width direction intermediate portion of the bumper reinforcement 18 is formed substantially in a straight line shape along the vehicle width direction, while vehicle width direction outer side portions 20 of the bumper reinforcement 18 are formed with gently curved profiles. End faces 20A1 of vehicle width direction outer side end portions 20A of the bumper reinforcement 18 are disposed further to the vehicle width direction outer side than vehicle width direction outer side faces 14B of the front side members 14. In FIG. 1, a state in which a front face 20A2 of the vehicle width direction outer side end portion 20A of the bumper reinforcement 18 has been deformed by a corner portion 22A of a barrier 22 is illustrated by solid lines, while its shape in a state prior to collision is illustrated by double-dotted intermittent lines.

The front side members 14 and the bumper reinforcement 18 described above configure respective framework members of a vehicle body. Crash boxes that are compressed along the vehicle front-rear direction so as to undergo plastic deformation and absorb collision energy when input with collision load of a specific value or greater through the bumper reinforcement 18, may also be installed to the front end portions 14A of the front side members 14.

Configuration of Relevant Portions

Extension Portion 30

As illustrated in FIG. 1, a plate shaped extension portion 30 is attached to a rear face 20A3 of each vehicle width direction outer side end portion 20A of the bumper reinforcement 18 described above. As illustrated in FIG. 4 to FIG. 7, the extension portion 30 is configured by a substantially rectangular, flat plate shaped plate body 30A, and a pair of short upper and lower flanges 30B bent toward the vehicle front side at an upper edge portion and a lower edge portion of the plate body 30A. The rigidity of the extension portion 30 is raised due to providing the pair of upper and lower flanges 30B.

As illustrated in FIG. 1, a vehicle width direction inside portion of the plate body 30A is fastened and fixed to the rear face 20A3 of the end portion 20A of the vehicle width direction outer side portion 20 of the bumper reinforcement 18, by a fixing method such as a fixing bolt 32 and a weld nut, not illustrated in the drawings. The extension portion 30 is thereby attached to the rear face 20A3 of the vehicle width direction outer side end portion 20A of the bumper reinforcement 18, and a vehicle width direction outer side portion of the plate body 30A extends further to the vehicle width direction outer side than an end face 20A1 of the vehicle width direction outer side end portion 20A of the bumper reinforcement 18. In other words, the plate shaped extension portions 30 are provided due to limitations in the vehicle to extending the vehicle width direction outer side end portions 20A of the bumper reinforcement 18 out a long way beyond the side faces 14B on the vehicle width direction outer sides of the front side members 14.

Projection Portion 34

As illustrated in FIG. 4 to FIG. 7, a block shaped projection portion 34 is installed at a front face 30A1 of a vehicle width direction outer side portion of the plate body 30A of the extension portion 30 described above. The projection portion 34 is configured by a main body 36 that has a hat profile in plan view, and plural reinforcement members 38 disposed inside the main body 36.

The main body 36 is configured by an inner wall 36A and an outer wall 36B, disposed facing each other along the vehicle width direction, and a front wall 36C connecting together a front end portion of the inner wall 36A and a front end portion of the outer wall 36B along the vehicle width direction. The inner wall 36A and the outer wall 36B extend substantially in the vehicle front-rear direction.

A rear end portion of the inner wall 36A is bent toward the vehicle width direction inside to configure an inside flange 36A1. The inside flange 36A1 is joined (fixed) to the front face 30A1 of the extension portion 30 by an arc weld 40 (see FIG. 7). A rear end portion of the outer wall 36B is bent toward the vehicle width direction outer side to configure an outside flange 36B1. The outside flange 36B1 is joined (fixed) to the front face 30A1 of the extension portion 30 by an arc weld 42 (see FIG. 7).

The inside flange 36A1 of the inner wall 36A corresponds to "one end portion of an inner wall" of the present invention, and a front end portion of the inner wall 36A (not allocated a reference numeral) corresponds to "another end portion of the inner wall" of the present invention. Similarly, the outside flange 36B1 of the outer wall 36B corresponds to "one end portion of an outer wall" of the present invention, and a front end portion of the outer wall 36B (not allocated a reference numeral) corresponds to "another end portion of the outer wall" of the present invention.

As illustrated in FIG. 1, the front wall 36C extends along the vehicle width direction and the vehicle up-down direction. A front face 36C1 of the front wall 36C is configured by a flat face.

Figure 4:
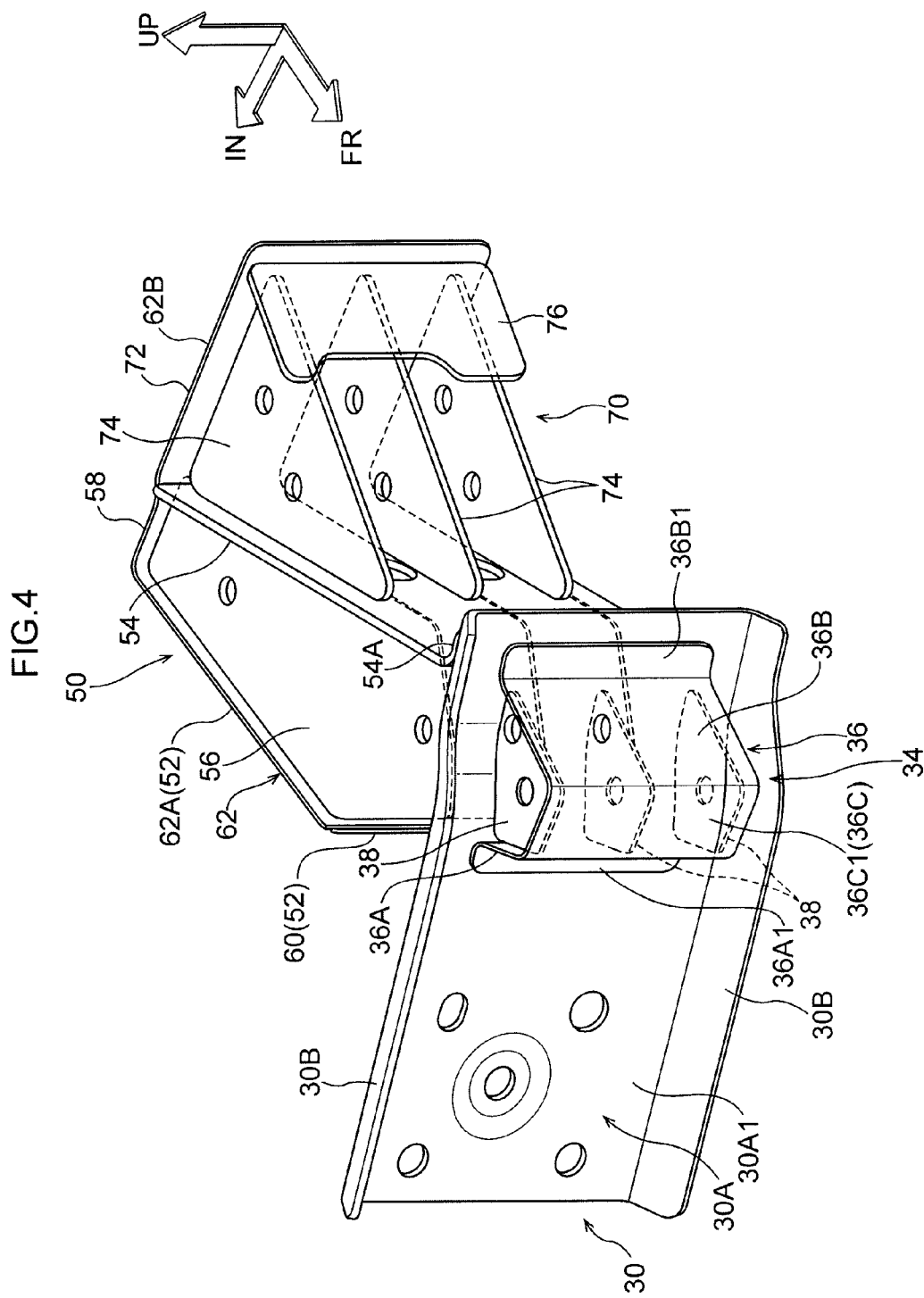
FIG. 4 is a perspective view illustrating relevant portions of a vehicle front section structure according to an exemplary embodiment of the present invention, as viewed diagonally from above and outside.
Figure 5:
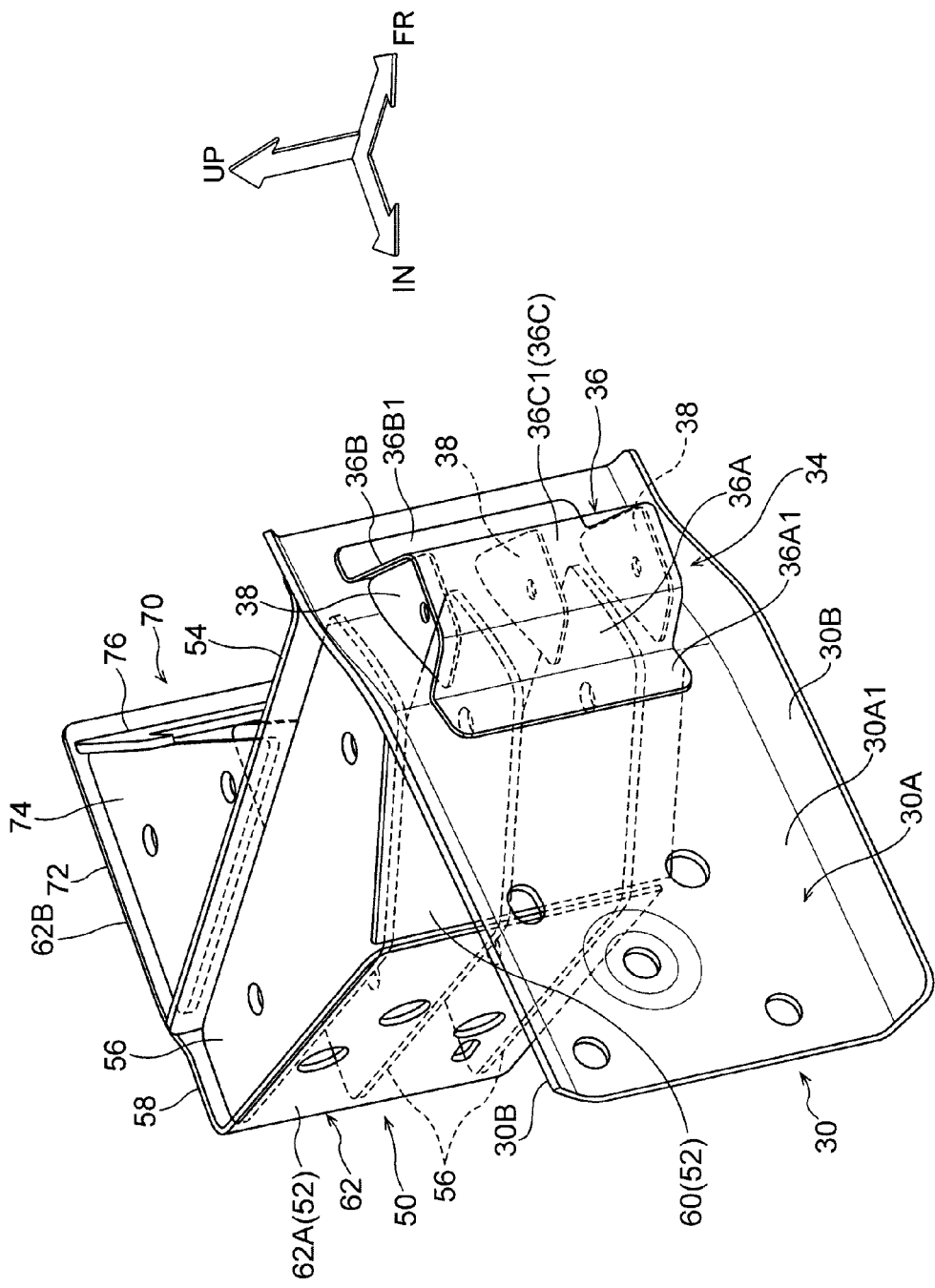
FIG. 5 is a perspective view illustrating relevant portions of a vehicle front section structure according to an exemplary embodiment of the present invention, as viewed diagonally from above and outside.
Figure 6:
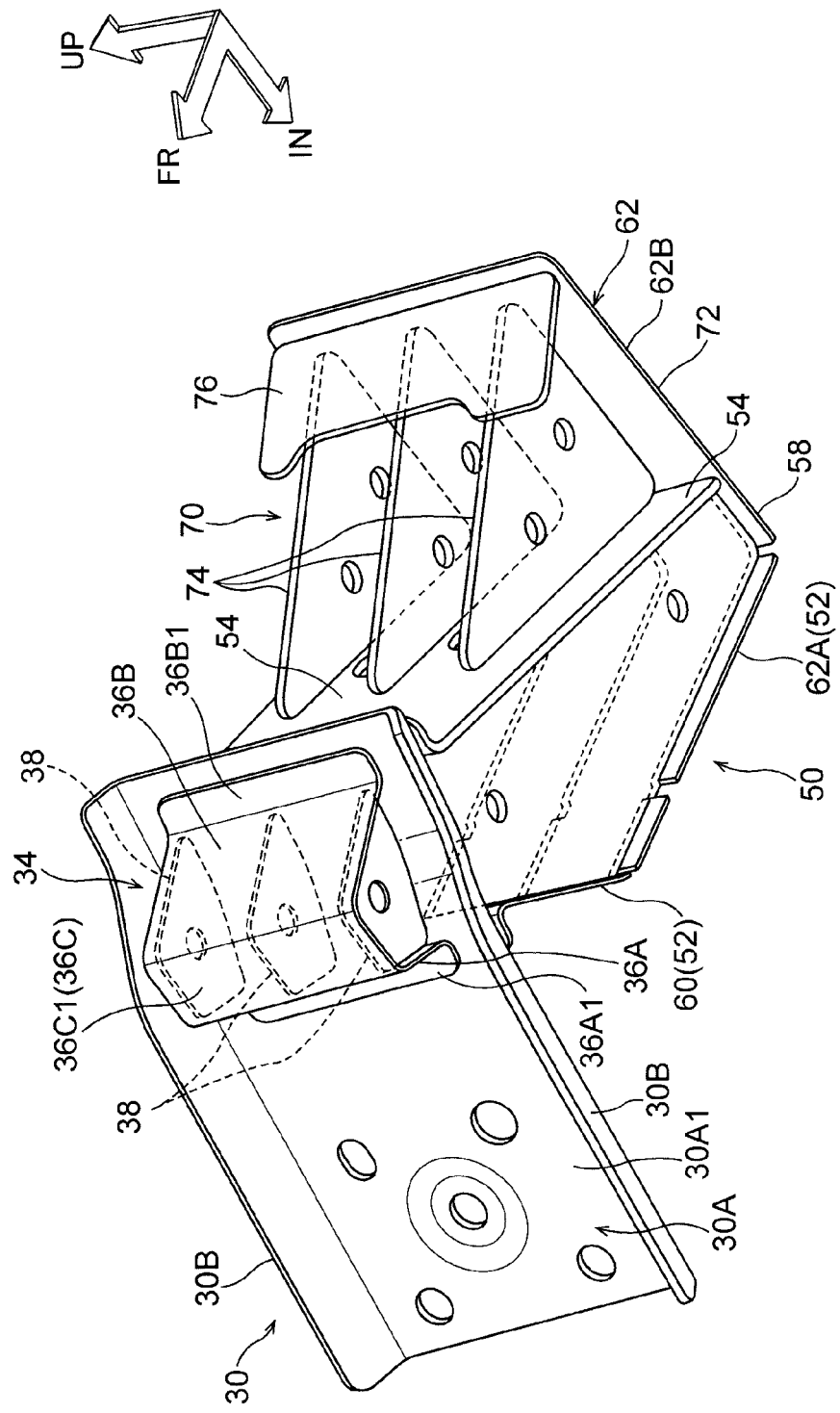
FIG. 6 is a perspective view illustrating relevant portions of a vehicle front section structure according to an exemplary embodiment of the present invention, as viewed diagonally from below and outside.

As illustrated in FIG. 4 to FIG. 6, the plural reinforcement members 38 are disposed inside the projection portion 34, at plural tiers in the vehicle up-down direction. Each reinforcement member 38 is configured from a plate member with a substantially trapezoidal shape in plan view, and outer peripheral portions thereof are respectively joined to inside faces of the inner wall 36A, the outer wall 36B, and the front wall 36C by arc welding or the like. The inner wall 36A, the outer wall 36B, and the front wall 36C are accordingly coupled together by the reinforcement members 38.

As illustrated in FIG. 1, a projection height a of the projection portion 34 mentioned above (the length from the front face 30A1 of the plate body 30A of the extension portion 30 to the front face 36C1 of the front wall 36C) is set with a specific height. Specifically, the projection height a is set at a height at which the front face 36C1 of the front wall 36C of the projection portion 34 contacts a main flat face portion 22B of the barrier 22 when the corner portion 22A of the barrier 22 has slightly deformed the front face 20A2 of the vehicle width direction outer side end portion 20A of the bumper reinforcement 18. Note that the projection height a does not necessarily have to match the contact height, and may be somewhat higher, or somewhat lower, than the contact height.

The projection portion 34 described above is disposed at a position even further to the vehicle width direction outer side than the vehicle width direction outer side end portion 20A of the bumper reinforcement 18, so as to be separated therefrom. A specific gap 44 is accordingly formed between the end face 20A1 of the vehicle width direction outer side end portion 20A of the bumper reinforcement 18 and the inner wall 36A of the projection portion 34.

Spacer 50

As illustrated in FIG. 1, and FIG. 4 to FIG. 6, an angular tube shaped spacer 50 couples together a vehicle width direction outer side portion of the plate body 30A of the extension portion 30 and a side wall 14C on the vehicle width direction outer side of the front side member 14, along the vehicle front-rear direction.

Structurally, the spacer 50 is configured from an inside wall 52 and an outside wall 54 disposed facing each other along the vehicle width direction, plural partitioning plates 56 coupling the inside wall 52 and the outside wall 54 together along the vehicle width direction, and a rear end wall 58 that is disposed at vehicle rear side end portions of the partitioning plates 56 and that couples together a rear end portion of the inside wall 52 and a rear end portion of the outside wall 54 along the vehicle width direction.

A front portion of the inside wall 52 is disposed at an angle toward the vehicle width direction outer side such that the front portion is positioned further to the vehicle width direction outer side than a rear portion of the inside wall 52 with respect to the side face 14B on the vehicle width direction outer side of the front side member 14. The outside wall 54 is disposed at the vehicle width direction outer side of the inside wall 52. The entire outside wall 54 is disposed at an angle toward the vehicle width direction outer side such that a front portion of the outside wall 54 is positioned further to the vehicle width direction outer side than a rear portion with respect to the side face 14B on the vehicle width direction outer side of the front side member 14.

More specifically, each of the partitioning plates 56 is formed with a long, thin five-sided profile extending substantially along the vehicle front-rear direction in plan view. The inside wall 52 is disposed so as to follow two sides on the vehicle width direction inside of each partitioning plate 56, and the outside wall 54 is disposed so as to follow an oblique side that faces these two sides along the vehicle width direction.

The inside wall 52 is configured by a first cover plate 60 disposed at a front portion side, and an upright wall 62A of a second cover plate 62 that is disposed at a rear portion side and has an angled shape in plan view. Namely, the inside wall 52 is split into a front end side and a rear end side. Note that the inside wall does not necessary have to be split, and may be configured by a single cover plate. The cover plates are split in order to reduce the vehicle weight, if only slightly, by eliminating a plate at a connection location (bent portion) between front portion and rear portion.

Figure 7:
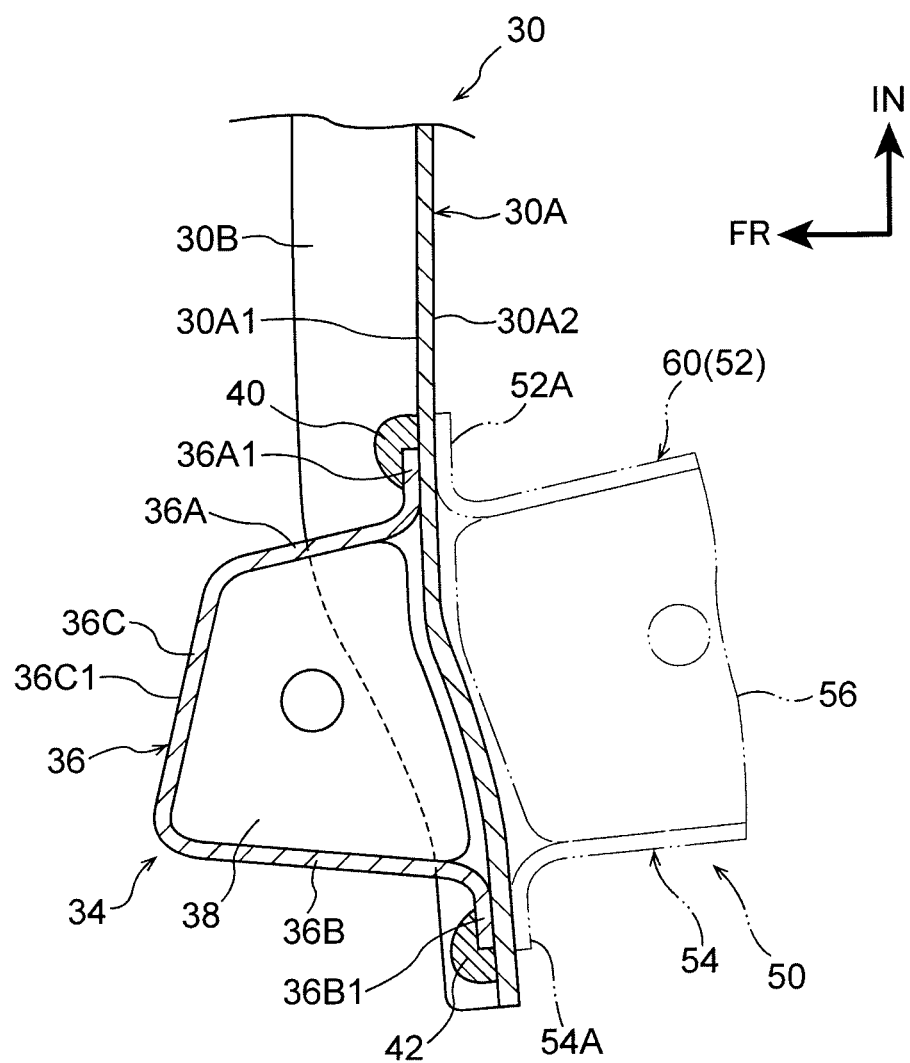
FIG. 7 is an enlarged plan view cross-section illustrating a fixing structure of a projection portion illustrated in FIG. 1.

As illustrated in FIG. 7, a front end portion of the first cover plate 60 is bent toward the vehicle width direction inside to configure an inside flange 52A (of the inside wall 52). The inside flange 52A is joined (fixed) to a rear face 30A2 of the plate body 30A of the extension portion 30 by arc welding. The first cover plate 60 is joined (fixed) to side faces at the inside of front portions of the plural partitioning plates 56 by arc welding.

As illustrated in FIG. 1, the upright wall 62A of the second cover plate 62 is overlaid with the side face 14B on the vehicle width direction outer side of the front side member 14, and fastened and fixed thereto by respective pairs of bolts 64 and weld nuts 66, at the front and rear in plan view. Note that the spacer 50 may be attached to the side wall 14C on the vehicle width direction outer side of the front side member 14 by welding instead of bolt fastening. Note that side faces at the inside of rear portions of the plural partitioning plates 56 are joined (fixed) to a vehicle width direction outer side face of the upright wall 62A of the second cover plate 62 by arc welding.

As illustrated in FIG. 7, a front end portion of the outside wall 54 is bent toward the vehicle width direction outer side to configure an outside flange 54A, and the outside flange 54A is joined (fixed) to the rear face 30A2 of the plate body 30A of the extension portion 30 by arc welding. The outside wall 54 is joined (fixed) to side faces on the vehicle width direction outer side of the plural partitioning plates 56 by arc welding.

As illustrated in FIG. 1, and FIG. 4 to FIG. 6, the rear end wall 58 is formed in an L-shape in plan view. The rear end wall 58 is configured by part of a lateral wall 62B of the second cover plate 62 mentioned above. The rear side portion of the inside wall 52 and the rear end wall 58 are accordingly configured by a single member.

In the present exemplary embodiment, the inside wall 52, the outside wall 54, and the partitioning plates 56 are all configured by separate components; however there is no limitation thereto, and the inside wall 52 and the outside wall 54 serving as an angled wall may be configured as a separate component to the partitioning plates 56. Namely, the inside wall 52, the rear end wall 58, and the outside wall 54 may be configured by a single component formed substantially in a U-shape open at a vehicle front side in plan view.

Next, explanation follows regarding a relationship between the walls configuring the projection portion 34 described above, and the walls configuring the spacer 50.

Figure 8:
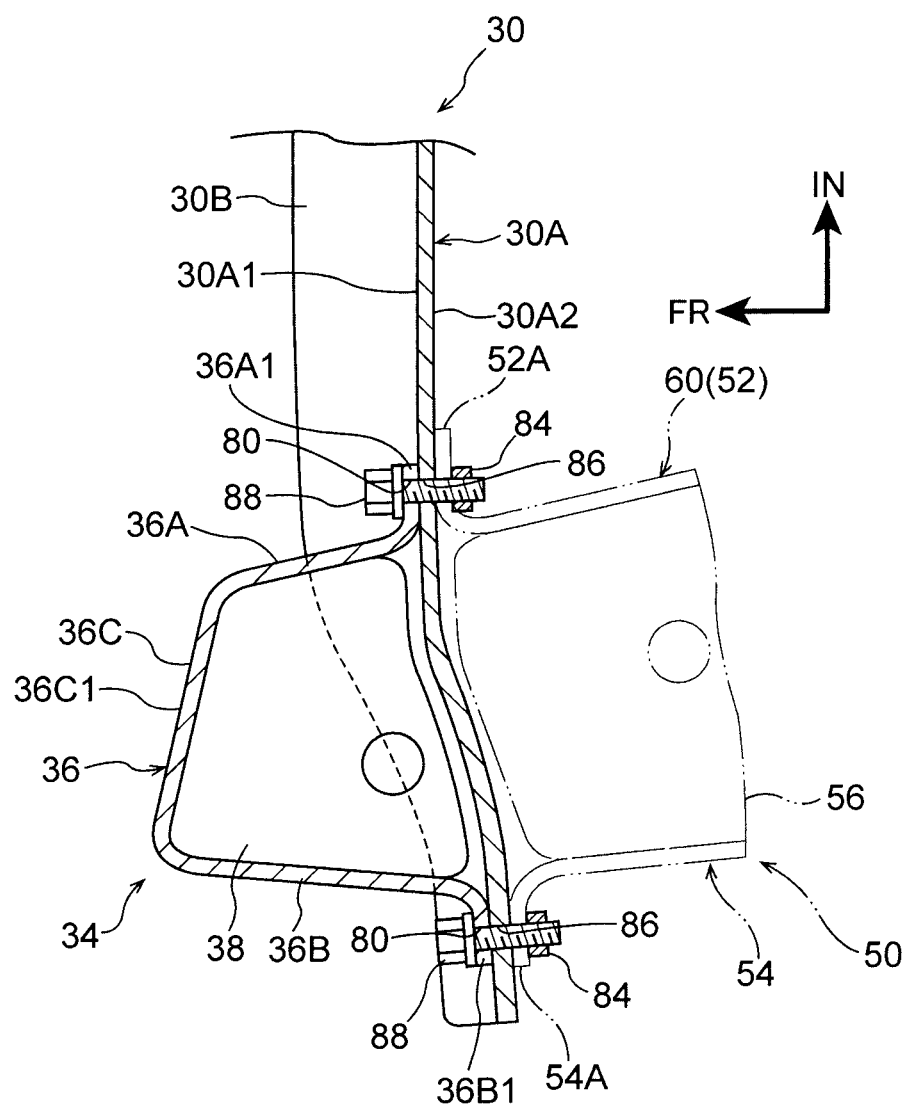
FIG. 8 is a plan view cross-section corresponding to FIG. 7, illustrating a modified example of a fixing structure of the projection portion illustrated in FIG. 7.

As illustrated in FIG. 8, the inside flange 36A1 (one end portion) of the inner wall 36A of the projection portion 34 is disposed at the vehicle front side of the inside wall 52 of the spacer 50, with the plate body 30A of the extension portion 30 interposed between them. The outside flange 36B1 (one end portion) of the outer wall 36B of the projection portion 34 is disposed at the vehicle front side of the outside wall 54, with the plate body 30A of the extension portion 30 disposed between them. Namely, the inner wall 36A of the projection portion 34 is disposed substantially along the extension direction of the inside wall 52 of the spacer 50. Similarly, the outer wall 36B of the projection portion 34 is disposed substantially along the extension direction of the outside wall 54 of the spacer 50.

The reinforcement members 38 inside the projection portion 34 and the partitioning plates 56 inside the spacer 50 are disposed at the same heights as each other in the vehicle up-down direction. Namely, the reinforcement members 38 and the partitioning plates 56 are disposed in the same respective planes as each other.

Spacer Extension Portion 70

As illustrated in FIG. 1, and in FIG. 4 to FIG. 6, a spacer extension portion 70 that has a substantially isosceles triangle shape in plan view is disposed on the vehicle width direction outer side of the spacer 50 described above. The spacer extension portion 70 is configured by an extension wall 72, plural support walls 74, and a reinforcement wall 76.

More specifically, the lateral wall 62B of the second cover plate 62 mentioned above is disposed orthogonally to the side face 14B on the vehicle width direction outer side of the front side member 14. A portion of the lateral wall 62B is disposed along rear edges of the partitioning plates 56 of the spacer 50, and configures the rear end wall 58 of the spacer 50. The remainder of the lateral wall 62B of the second cover plate 62 configures the extension wall 72 of the spacer extension portion 70, and extends the rear end wall 58 of the spacer 50 toward the vehicle width direction outer side. In the present exemplary embodiment, the rear end wall 58 of the spacer 50 and the extension wall 72 of the spacer extension portion 70 are accordingly configured from the same member. The rear end wall 58 of the spacer 50 and the extension wall 72 of the spacer extension portion 70 may, however, be configured by separate components. A length C of the extension wall 72 along the vehicle width direction is set longer than a length B of the front side member 14 along the vehicle width direction.

The plural support walls 74 are disposed orthogonally to the outside wall 54 of the spacer 50, and at the vehicle width direction outer side thereof. The plural support walls 74 are disposed parallel to an upper face 14D of the front side member 14. An oblique edge on the vehicle width direction inside of each of the support walls 74 is arc welded to a side face on the vehicle width direction outer side of the outside wall 54 of the spacer 50. Base edges of the respective support walls 74 are welded to a face on the vehicle front side of the extension wall 72 of the lateral wall 62B of the second cover plate 62. The support walls 74 accordingly couple the extension wall 72 to the outside wall 54 of the spacer 50 in the vehicle front-rear direction. At the same time, the extension wall 72 is supported by the outside wall 54, this being an angled wall, through the support walls 74.

The present exemplary embodiment is set with the same number (three) of the reinforcement members 38 of the projection portion 34 described above as the number of the partitioning plates 56 of the spacer 50 and the number of the support walls 74 of the spacer extension portion 70. Moreover, the reinforcement members 38, the partitioning plates 56, and the support walls 74 are disposed at the same heights as each other in the vehicle up-down direction. Namely, the reinforcement members 38, the partitioning plates 56, and the support walls 74 are disposed in the same planes as each other. Note that the above is merely an example, and configuration may be made with a single support wall 74, or with two, or four or more, support walls 74.

In the present exemplary embodiment, the support walls 74 are formed in isosceles triangle shapes in plan view, such that the length of the support walls 74 along the vehicle width direction decreases on progression toward the vehicle front side. However, there is no limitation thereto, and the support walls 74 may be formed in right-angled triangle shapes, or may be formed in other shapes.

A vehicle rear side face of the lateral wall 62B of the second cover plate 62 is configured by a flat face. Namely, the lateral wall 62B is not formed with steps or undulations in the vehicle front-rear direction, and the vehicle rear side face of the lateral wall 62B is configured as a continuous flat face along the vehicle width direction and the vehicle up-down direction.

The reinforcement wall 76 disposed at the oblique edges on the vehicle width direction outer side of the plural support walls 74, at the extension wall 72 side. The reinforcement wall 76 couples the plural support walls 74 together along the vehicle up-down direction by being arc welded to the vehicle width direction outer side oblique edges of the plural support walls 74.

Next, explanation follows regarding operation and advantageous effects of the present exemplary embodiment.

Overall Operation and Advantageous Effects

Initial Period in Small Overlap Collision

In the vehicle front section structure according to the present exemplary embodiment, each vehicle width direction outer side end portion 20A of the bumper reinforcement 18 is provided with the extension portion 30 extending further to the vehicle width direction outer side than the rear face 20A3 of the end portion 20A. At the front face of the extension portion 30, the projection portion 34 is disposed projecting out toward the vehicle front side at a position separated from the vehicle width direction outer side end portion 20A of the bumper reinforcement 18 at the vehicle width direction outer side. The front end portion of the spacer 50 is joined to the rear face 30A2 of the plate body 30A of the extension portion 30, the rear end portion of the spacer 50 being joined to the side face 14B on the vehicle width direction outer side of the front side member 14 and the spacer 50 extending to the vehicle width direction outer side of the front side member 14. Accordingly, as illustrated in FIG. 1, in the event of a small overlap collision, the barrier 22 quickly contacts the front wall 36C of the projection portion 34 in an initial period of a small overlap collision. A collision load F is thus input to the projection portion 34 from the point in time of the initial period of the small overlap collision.

Initial Period Onward in Small Overlap Collision

Figure 2:
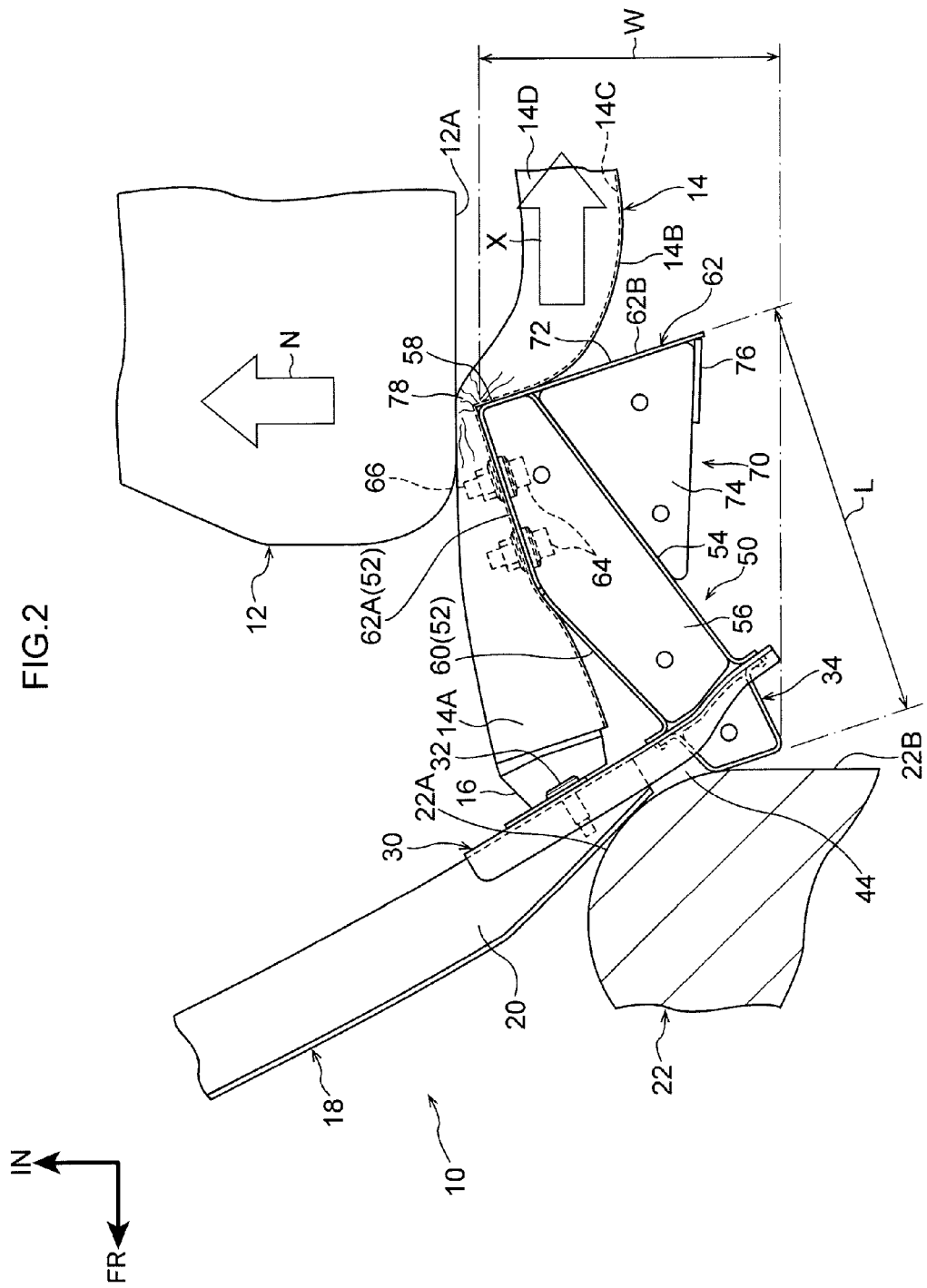
FIG. 2 is a plan view illustrating a state in which a front side member has folded inward from the state illustrated in FIG. 1.

As illustrated in FIGS. 1 and 2, when the collision load F is input to the projection portion 34, in a case in which d is the distance from a center line P passing through the centroid of the front side member 14 in plan view, to a vehicle front-rear direction line Q passing through the input position of the collision load F, then a bending moment M (=F×d) acts on the side face 14B on the vehicle width direction outer side of the front side member 14, through the projection portion 34 and the spacer 50. As a result, the front side member 14 undergoes bending deformation toward the vehicle width direction inside (for convenience referred to as "inward folding" below). A location 78 that has undergone bending deformation contacts a side face 12A of the power unit 12, pushing the power unit 12 toward the opposite side to the collision side. Namely, lateral force (force due to inertia) N acts on the power unit 12 toward the opposite side to the collision side, and the lateral force N moves the vehicle away from the barrier 22.

Advantageous Effects Obtained from Individual Configuration Elements Operation and Advantageous Effects Due to Spacer Extension Portion 70

Note that it is conceivable that variations in vehicle structures, test conditions, or the like could cause change in the way the spacer 50 strikes the power unit 12 across the front side member 14, so that a target load is not obtainable stably.

Figure 3:
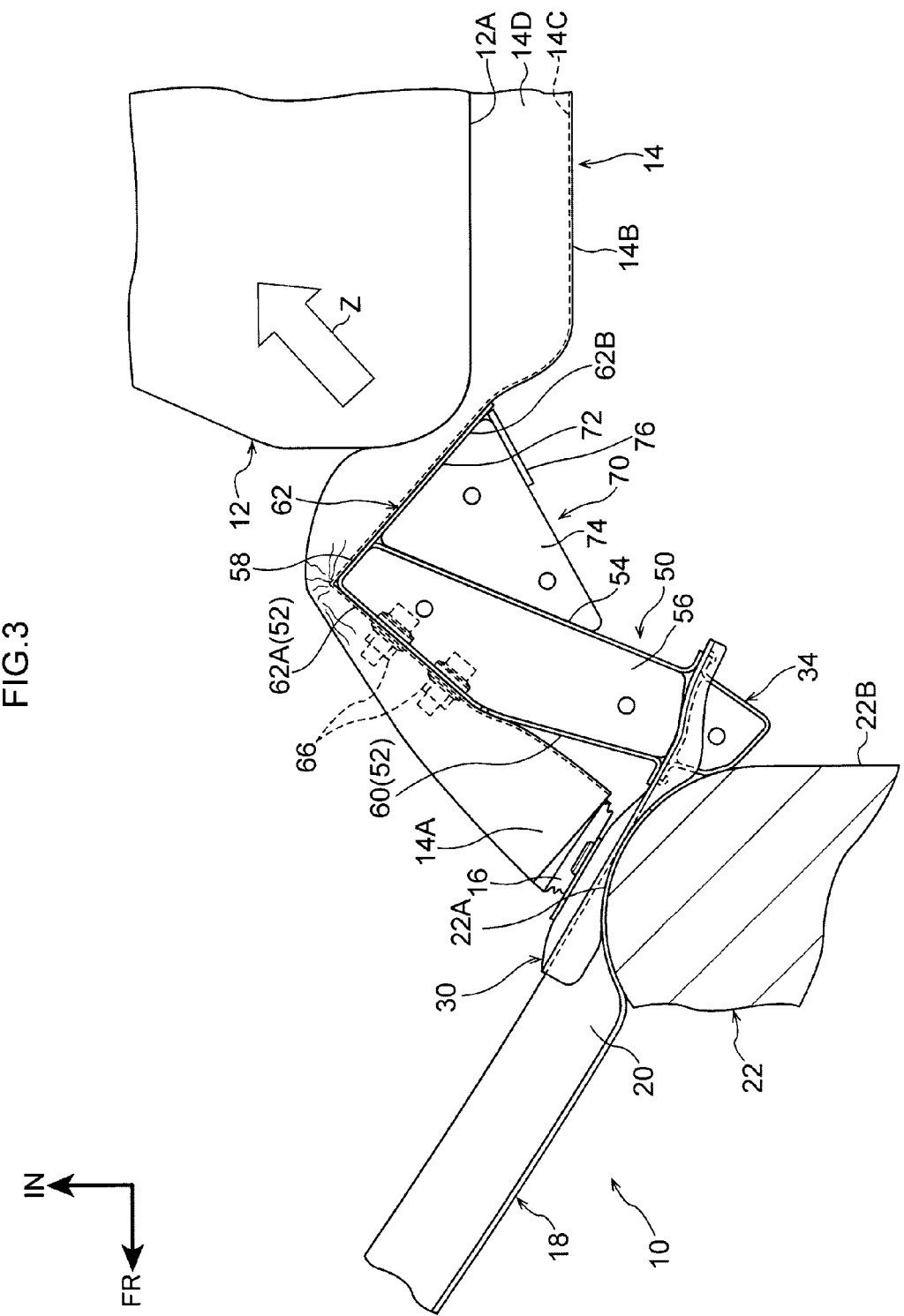
FIG. 3 is a plan view to explain an advantageous effect due to providing a spacer extension portion.

However, in the present exemplary embodiment, the spacer extension portion 70 is provided at the vehicle width direction outer side of the outside wall 54 of the spacer 50, and the rear end wall 58 of the spacer 50 is extended toward the vehicle width direction outer side by the extension wall 72. Accordingly, as illustrated in FIG. 2, even supposing there was a reduction in the load with which the spacer 50 causes the front side member 14 to undergo axial compression deformation in the vehicle front-rear direction due to variation in vehicle structures, test conditions, or the like, the extension wall 72 of the spacer extension portion 70 would, in place of the rear end wall 58 of the spacer 50, continue to cause axial compression load (illustrated by the arrow X) to act on the front side member 14 toward the vehicle rear side, causing the front side member 14 to undergo axial compression plastic deformation. Moreover, as illustrated in FIG. 3, even supposing the load with which the spacer 50 presses the power unit 12 toward the opposite side to the collision side was to be reduced due to variation in vehicle structures, test conditions, or the like, the extension wall 72 of the spacer extension portion 70 would still, in place of the rear end wall 58 of the spacer 50, continue to press the power unit 12 toward the opposite side to the collision side to cause lateral force (illustrated by the arrow Z) to act on the power unit 12.

Accordingly, the vehicle front section structure according to the present exemplary embodiment enables the front side member 14 to be made to undergo stable axial compression deformation in the vehicle front-rear direction, and enables lateral force to be made to act on the power unit 12 stably, in a small overlap collision, even when there are variations in vehicle structures, test conditions, or the like.

In the present exemplary embodiment, a length C of the extension wall 72 in the vehicle width direction is set longer than the length B of the front side member 14 in the vehicle width direction. This thereby enables (sustained) axial direction load to be stably imparted to the front side member 14, and enables (sustained) lateral force to be stably generated on the power unit 12.

Moreover, in the present exemplary embodiment, the extension wall 72 and the outside wall 54 (angled wall) of the spacer 50 are coupled together by the support walls 74, and the extension wall 72 is supported by the outside wall 54. Accordingly, the extension wall 72 obtains a reaction force from the plural support walls 74, enabling (sustained) axial compression load to be stably imparted to the front side member 14, and enabling (sustained) lateral force to be stably generated on the power unit 12.

In the present exemplary embodiment, the support walls 74 are set with decreasing vehicle width direction length on progression toward the vehicle front side. This makes it easier to secure installation space for a lamp or the like.

In the present exemplary embodiment, the rear end wall 58 of the spacer 50 and the extension wall 72 of the spacer extension portion 70 are configured by the same member (the lateral wall 62B of the second cover plate 62). This thereby enables a reduction in the number of components and a reduction in assembly steps, thereby enabling a reduction in costs in comparison to cases in which the rear end wall 58 of the spacer 50 and the extension wall 72 of the spacer extension portion 70 are configured from separate members.

In the present exemplary embodiment, the vehicle rear side face of the lateral wall 62B of the second cover plate 62 is configured by a flat face. This thereby enables axial compression load to be more smoothly imparted to the front side member 14, and enables lateral force to be more smoothly imparted to the power unit 12, than in cases in which the vehicle rear side face of the lateral wall is not a flat face.

The rear end wall 58 of the spacer 50 and the extension wall 72 of the spacer extension portion 70 are disposed orthogonally to the side face 14B on the vehicle width direction outer side of the front side member 14. Accordingly, when collision load is input to the projection portion 34 from the barrier 22, the rear end wall 58 and the extension wall 72 act as an effective wedge to fold the front side member 14 inward.

The spacer 50 includes the outside wall 54 that is an angled wall, and the plural partitioning plates 56 that are disposed orthogonal to the outside wall 54 and disposed parallel to the upper face 14D of the front side member 14, and that are joined to the outside wall 54. The partitioning plates 56 of the spacer 50 and the support walls 74 of the spacer extension portion 70 are disposed in the same plane as each other. To elaborate, although it would be possible to form the outside wall 54 and the partitioning plates 56 by bending a single plate member, in such a configuration, the surface of the bent portion would have a circular arc shape, necessitating welding of the support walls 74 at a position where the arced face of the bent portion has ended. Due to such a relationship at the joint, the respective heights of the partitioning plates 56 and the support walls 74 would no longer be aligned. However, configuring the outside wall 54 and the partitioning plates 56 from separate components as described above, and integrating them together by welding, enables the heights of the partitioning plates 56 and the support walls 74 to be aligned. The partitioning plates 56 and the support walls 74 accordingly form contiguous walls at each side of the outside wall 54. Namely, not only is the rear end wall 58 extended toward the vehicle width direction outer side by the addition of the extension wall 72, but the partitioning plates 56 can also be extended toward the vehicle width direction outer side by the addition of the support walls 74. This thereby enables a structural body of equivalent strength to the spacer 50 to be added at the vehicle width direction outer side, while suppressing an increase in weight, thus enabling the front side member 14 to be made to undergo more effective axial compression deformation in the vehicle front-rear direction, and more effectively generating lateral force using the power unit 12, in a small overlap collision.

In the present exemplary embodiment, the front end portion (the inside flange 52A and the outside flange 54A, but particularly the outside flange 54A) of the spacer 50 is joined to the extension portion 30 extending further out from the rear face 20A3 of the vehicle width direction outer side end portion 20A of the bumper reinforcement 18 toward the vehicle width direction outer side. Collision load from the barrier 22 is therefore reliably transmitted through the inside wall 52 and the outside wall 54 of the spacer 50 (in particular, through the outside wall 54) to a side wall 14C on the vehicle width direction outer side of the front side member 14.

Other Exemplary Embodiments

Regarding the Projection Portion Fixing Structure

As illustrated in FIG. 7, in the present exemplary embodiment, the inside flange 36A1 and the outside flange 36B1 of the projection portion 34 are joined to the front face 30A1 of the plate body 30A of the extension portion 30 by arc welding. However, there is no limitation thereto, and a welding technique such as spot welding or laser welding may be employed.

As illustrated in FIG. 8, instead of welding, a mechanical fixing technique may be employed to fix a projection portion to an extension portion. In this example, bolt insertion holes 80 are respectively formed to the inside flange 36A1 of the inner wall 36A and the outside flange 36B1 of the outer wall 36B of the projection portion 34. Similarly, bolt insertion holes 82 are also formed to the inside flange 52A of the inside wall 52 and the outside flange 54A of the outside wall 54 of the spacer 50, coaxially to the bolt insertion holes 80. Weld nuts 84 are welded to the inside flange 52A and the outside flange 54A respectively. The plate body 30A of the extension portion 30 is also formed with bolt insertion holes 86, coaxially to the bolt insertion holes 80, 82. Bolts 88 are screwed onto the weld nuts 84, thereby fastening the projection portion 34 to the front face 30A1 of the plate body 30A of the extension portion 30, together with the spacer 50. Rivets or the like may also be employed in addition to the bolts 88 and the weld nuts 84.

According to the above configuration, due to fixing the projection portion 34 to the extension portion 30 using the bolts 88 and the weld nuts 84 or the like, the projection portion 34 can be removed from the extension portion 30 as required. In cases in which a philosophy is adopted of causing plastic deformation (crushing) of the projection portion 34 in the vehicle front-rear direction and absorbing energy even in small overlap collisions, in a minor collision, adopting this configuration accordingly enables the projection portion 34 alone to be replaced in repair work following a minor collision. This thereby enables a reduction in repair costs.

Regarding Crushability of the Projection Portion

In the present exemplary embodiment, the plural plates of the reinforcement members 38 are disposed inside the main body 36 of the projection portion 34 that has a hat profile in plan view, and the projection portion 34 is configured so as not to buckle in the vehicle front-rear direction in a small overlap collision. Taking this line of thinking further, the projection portion 34 illustrated in FIG. 1 and FIG. 4 may be configured with extra reinforcement.

Figure 9:
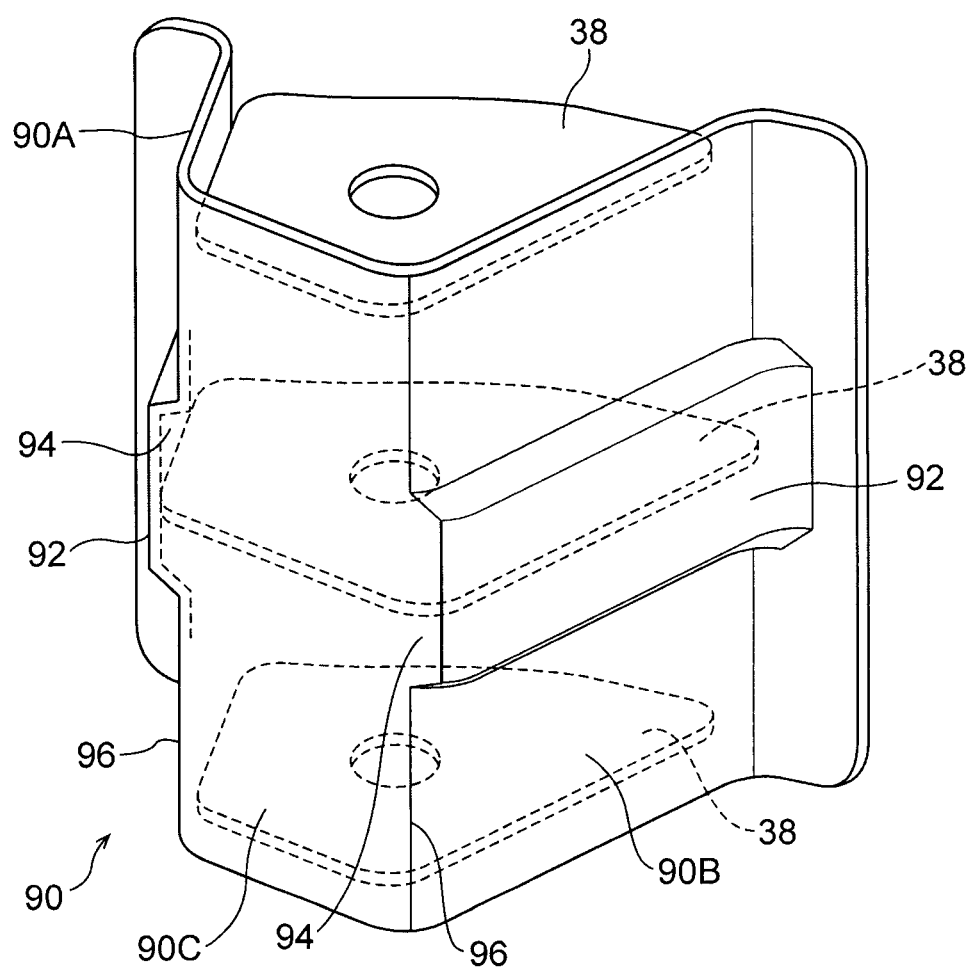
FIG. 9 is an enlarged perspective view illustrating a first modified example of the shape and structure of the projection portion illustrated in FIG. 4.

For example, a projection portion 90 illustrated in FIG. 9 is configured by the elements of an inner wall 90A, an outer wall 90B, and a front wall 90C, similarly to the projection portion 34. However, the inner wall 90A and the outer wall 90B are each formed with a raised bead 92, serving as a reinforcement portion and extending substantially in the vehicle front-rear direction. The raised beads 92 are disposed at vehicle up-down direction intermediate portions of the inner wall 90A and the outer wall 90B respectively. During formation of the raised beads 92, protruding faces 94 are formed projecting out along the vehicle width direction at a height direction intermediate portion of the front wall 90C. In other words, the raised beads 92 are connected to ridge lines 96 on both vehicle width direction sides of the front wall 90C, and increase the length of the respective ridge lines 96. Plural reinforcement members 38 are disposed inside the projection portion 90 and couple together the inner wall 90A, the outer wall 90B, and the front wall 90C. The reinforcement member 38 disposed at the middle tier has a greater vehicle width direction width than the upper tier and lower tier reinforcement members 38, in order to couple together the left and right raised beads 92 in the vehicle width direction.

In the projection portion 90, the respective raised beads 92 are formed to the inner wall 90A and the outer wall 90B, and so the rigidity of the projection portion 90 with respect to collision load input from the vehicle front side is greater than that of the projection portion 34 illustrated in FIG. 1 and FIG. 4. This thereby enables faster transmission of collision load to the front side member 14 through the spacer 50 in the event of a small overlap collision. The front side member 14 can accordingly be folded inward more promptly, enabling earlier generation of lateral force on the power unit 12.

Note that there is no limitation to forming a single raised bead 92 on each wall face mentioned above, and plural raised beads 92 may be formed.

Figure 10:
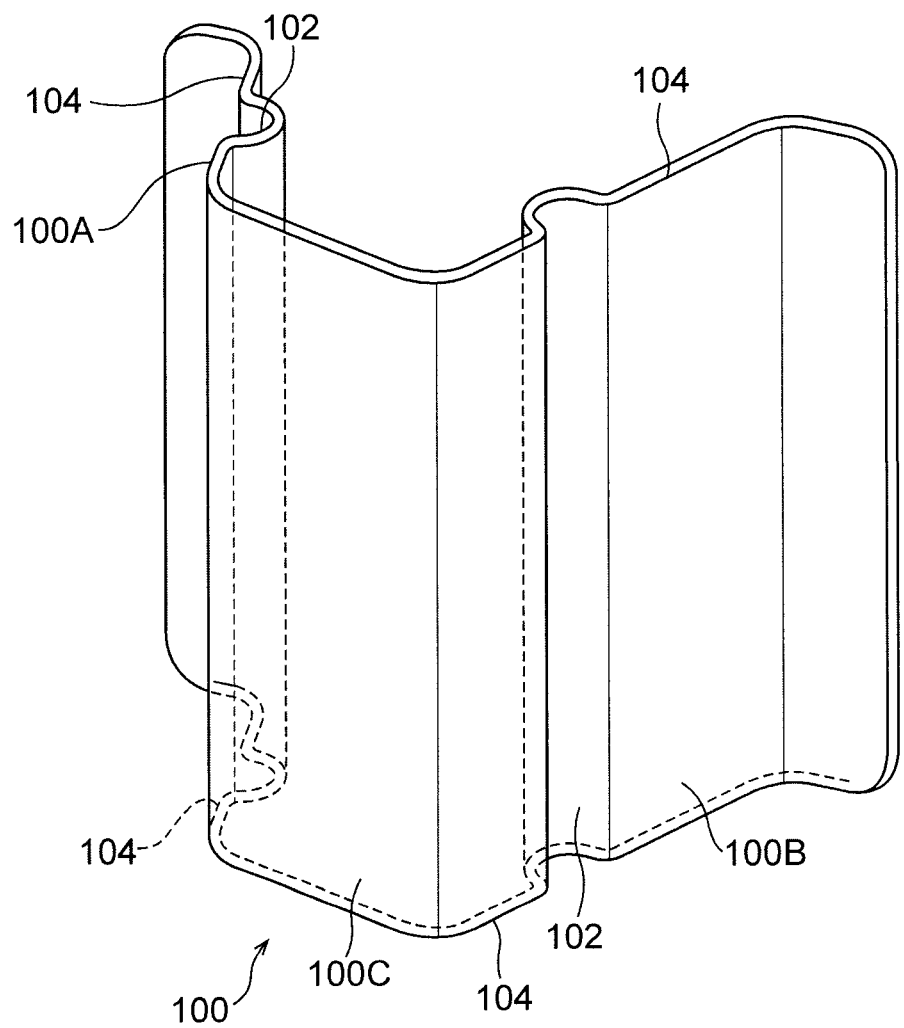
FIG. 10 is an enlarged perspective view illustrating a second modified example of the shape and structure of the projection portion illustrated in FIG. 4.

The projection portion 34 illustrated in FIG. 1 and FIG. 4, and the projection portion 90 illustrated in FIG. 9, are of a type that gives precedence to load transmission performance over energy absorption performance. However, the projection portion 100 illustrated in FIG. 10 may be employed when higher energy absorption performance is desired.

Explained briefly, the projection portion 100 is configured from the elements of an inner wall 100A, an outer wall 100B, and a front wall 100C, similarly to the projection portion 34. However, the inner wall 100A and the outer wall 100B are each formed with an indented bead 102, serving as a weakened portion and extending substantially in the vehicle up-down direction. The indented beads 102 are disposed at vehicle front-rear direction intermediate portions of the inner wall 100A and the outer wall 100B. Moreover, the indented beads 102 divide respective upper and lower ridge lines 104 of the inner wall 100A and the outer wall 100B. Note that reinforcement members 38 are not provided inside the projection portion 100.

In the projection portion 100, the inner wall 100A and the outer wall 100B are respectively formed with the indented beads 102, these being weakened portions. Accordingly, when collision load is input from the vehicle front side, stress is concentrated on the indented beads 102. The inner wall 100A and the outer wall 100B accordingly buckle at the positions formed with the indented beads 102, and the projection portion 100 undergoes plastic compression deformation in the vehicle front-rear direction. The projection portion 100 accordingly absorbs some of the energy during a collision.

Note that there is no limitation to forming a single indented bead 102 on each wall face, and plural indented beads 102 may be formed.

Other

The present exemplary embodiment is provided with the projection portion 34; however there is no limitation thereto, and the projection portion may be omitted.

In the present exemplary embodiment, the extension portion 30 is provided to the rear face 20A3 of the vehicle width direction outer side end portion 20A of the bumper reinforcement 18; however there is no limitation thereto. The extension portion 30 may be omitted in cases in which a vehicle width direction outer side end portion of the bumper reinforcement extends out by an equivalent amount with respect to the side face on the vehicle width direction outer side of the front side member. In such cases, the front end portion of the spacer may be joined to the rear face of the vehicle width direction outer side end portion of the bumper reinforcement, either directly, or through a bracket.

Moreover, in the present exemplary embodiment, the inside wall 52, the outside wall 54, and the partitioning plates 56 are all configured as separate components; however there is no limitation thereto, and configuration may be made such that at least one out of an inside wall or an outside wall is configured as a separate component to a partitioning plate. For example, an inside wall, a rear end wall, and an outside wall may all be configured by a single member.

The present exemplary embodiment is provided with three of the support walls 74; however there is no limitation thereto, and one, two, or four or more of the support walls 74 may be provided. The plate thickness may be increased when configuration is made with a single support wall 74.

In the present exemplary embodiment, the length C of the extension wall 72 in the vehicle width direction is set longer than the length B of the front side member 14 in the vehicle width direction; however there is no limitation thereto, and the length of the extension wall 72 in the vehicle width direction may be set the same as, or set shorter than, the length of the front side member in the vehicle width direction.

In the present exemplary embodiment, the rear face of the lateral wall 62B of the second cover plate 62 is configured by a flat face; however there is no limitation thereto, and undulations or steps may be provided.

In the present exemplary embodiment, the lateral wall 62B of the second cover plate 62 is disposed orthogonally to the side face 14B on the vehicle width direction outer side of the front side member 14; however there is no limitation thereto, and the rear end wall and the extension wall may be disposed somewhat at an angle with respect to the side face on the vehicle width direction outer side of the front side member.

What is claimed is:

1. A vehicle front section structure comprising:
   a pair of left and right front side members extending along a vehicle front-rear direction at both vehicle width direction sides of a power unit installed in a vehicle front section;
   a spacer including an angled wall that is provided at a side face on a vehicle width direction outer side of at least one of the front side members, that is disposed at the vehicle width direction outer side of the side face, and that increases in distance from the side face on progression toward a vehicle front side, and including a rear end wall extending from a rear end of the angled wall toward the side face; and
   a spacer extension portion that is provided at the vehicle width direction outer side of the angled wall of the spacer, and that includes an extension wall extending the rear end wall of the spacer toward the vehicle width direction outer side.

2. The vehicle front section structure of claim 1, wherein a length of the extension wall along the vehicle width direction is longer than a length of the at least one of the front side members in the vehicle width direction.

3. The vehicle front section structure of claim 1, wherein the spacer extension portion further includes one or more support walls that couple the extension wall to the angled wall of the spacer, and that support the extension wall from the angled wall.

4. The vehicle front section structure of claim 3, wherein the one or more support walls decrease in length along the vehicle width direction on progression toward the vehicle front side.

5. The vehicle front section structure of claim 1, wherein the rear end wall of the spacer and the extension wall of the spacer extension portion are configured by a same member.

6. The vehicle front section structure of claim 5, wherein a face on a vehicle rear side of the same member is configured by a flat face.

7. The vehicle front section structure of claim 1, wherein the rear end wall of the spacer and the extension wall of the spacer extension portion are disposed orthogonally to the side face on the vehicle width direction outer side of the at least one of the front side members.

8. The vehicle front section structure of claim 3, wherein:
   the spacer includes
      the angled wall, and
      a plurality of partitioning plates that are disposed orthogonally to the angled wall, that are disposed parallel to an upper face of the at least one of the front side members, and that are welded to the angled wall; and
   the partitioning plates of the spacer and the support walls of the spacer extension portion are disposed in same respective planes as each other.

9. The vehicle front section structure of claim 1, further comprising:
   a bumper reinforcement that connects together front end portions of the pair of left and right front side members along the vehicle width direction,
   wherein a front end portion of the spacer is joined to an extension portion extending further toward the vehicle width direction outer side either from a vehicle width direction outer side end portion of the bumper reinforcement, or from a rear face of the vehicle width direction outer side end portion.

10. The vehicle front section structure of claim 2, wherein the spacer extension portion further includes one or more support walls that couple the extension wall to the angled wall of the spacer, and that support the extension wall from the angled wall.

11. The vehicle front section structure of claim 10, wherein the support wall is set so as to decrease in length along the vehicle width direction on progression toward the vehicle front side.

12. The vehicle front section structure of claim 2, wherein the rear end wall of the spacer and the extension wall of the spacer extension portion are configured by a same member.

13. The vehicle front section structure of claim 12, wherein a face on a vehicle rear side of the same member is configured by a flat face.

14. The vehicle front section structure of claim 2, wherein the rear end wall of the spacer and the extension wall of the spacer extension portion are disposed orthogonally to the side face on the vehicle width direction outer side of the at least one of the front side members.

15. The vehicle front section structure of claim 10, wherein:
    the spacer includes
        the angled wall, and
        a plurality of partitioning plates that are disposed orthogonally to the angled wall, that are disposed parallel to an upper face of the at least one of the front side members, and that are welded to the angled wall; and
    the partitioning plates of the spacer and the support walls of the spacer extension portion are disposed in same respective planes as each other.

16. The vehicle front section structure of claim 2, further comprising:
    a bumper reinforcement that connects together front end portions of the pair of left and right front side members along the vehicle width direction,
    wherein a front end portion of the spacer is joined to an extension portion extending further toward the vehicle width direction outer side either from a vehicle width direction outer side end portion of the bumper reinforcement, or from a rear face of the vehicle width direction outer side end portion.

* * * * *